(12) United States Patent
Lakata

(10) Patent No.: US 12,428,092 B2
(45) Date of Patent: Sep. 30, 2025

(54) HANDS FREE BICYCLE

(71) Applicant: Timothy M. Lakata, Southwick, MA (US)

(72) Inventor: Timothy M. Lakata, Southwick, MA (US)

(*) Notice: Subject to any disclaimer, the term of this patent is extended or adjusted under 35 U.S.C. 154(b) by 799 days.

(21) Appl. No.: 17/680,430

(22) Filed: Feb. 25, 2022

(65) Prior Publication Data
US 2022/0289330 A1 Sep. 15, 2022

Related U.S. Application Data

(60) Provisional application No. 63/159,509, filed on Mar. 11, 2021.

(51) Int. Cl.
B62K 3/00 (2006.01)
B62K 15/00 (2006.01)
B62L 3/04 (2006.01)
B62J 6/022 (2020.01)
B62J 6/045 (2020.01)

(52) U.S. Cl.
CPC .............. *B62K 3/00* (2013.01); *B62K 15/006* (2013.01); *B62L 3/04* (2013.01); *B62J 6/022* (2020.02); *B62J 6/045* (2020.02); *B62K 2204/00* (2013.01)

(58) Field of Classification Search
CPC .... B62K 3/00; B62K 15/006; B62K 2204/00; B62K 3/10; B62K 5/025; B62K 5/06; B62K 19/16; B62K 23/02; B62K 23/08; B62K 19/06; B62K 21/00; B62K 25/04; B62L 3/04; B62J 6/022; B62J 6/045; B62J 43/28; B62J 25/06; B62J 43/16; B60L 50/60; B60L 2200/12; B60L 2240/421; B60L 7/10; B62M 7/12
See application file for complete search history.

(56) References Cited

U.S. PATENT DOCUMENTS

| 7,017,685 | B2* | 3/2006 | Schoenberg | B60K 16/00 180/2.1 |
| 8,640,808 | B2* | 2/2014 | Kissick | B62K 23/08 180/315 |
| 8,746,720 | B2* | 6/2014 | Liao | B62M 1/16 280/244 |
| 9,387,906 | B2* | 7/2016 | Rasmussen | B60L 3/003 |
| 9,586,647 | B1* | 3/2017 | Parker | B62M 1/26 |
| 10,730,584 | B2* | 8/2020 | Ragland | B62J 25/04 |

(Continued)

*Primary Examiner* — Valentin Neacsu
*Assistant Examiner* — Marlon A Arce
(74) *Attorney, Agent, or Firm* — Bulkley, Richardson and Gelinas, LLP; Mary R. Bonzagni, Esq.

(57) ABSTRACT

An electric bicycle includes a frame that has a concave or arc shape. The bicycle also includes two wheels—a front wheel and a rear wheel, with each wheel being connected with an end portion of the frame. A battery-powered electric motor may be connected with the rear wheel to drive the rear wheel and propel the bicycle forward. The battery may be rechargeable. The speed of the bicycle may be controlled by the operator moving a lever with one of their feet. A rotatable knob located on the frame may be used as a cruise control speed setting device. The electric bicycle may be steered by the operator using their feet resting on a pair of foot pegs that are attached to or connected with the front wheel. The electric bicycle may include a regenerative braking system or a friction braking system.

19 Claims, 3 Drawing Sheets

(56) References Cited

U.S. PATENT DOCUMENTS

| | | | |
|---|---|---|---|
| 2017/0240241 A1* | 8/2017 | Wunderlin | B62M 7/12 |
| 2019/0217914 A1* | 7/2019 | Huang | B62K 5/06 |
| 2019/0248439 A1* | 8/2019 | Wang | B62K 11/10 |
| 2020/0239095 A1* | 7/2020 | Radenbaugh | B62J 7/04 |
| 2020/0283092 A1* | 9/2020 | Doerksen | B62M 6/50 |
| 2024/0226706 A1* | 7/2024 | Marabese | A63C 17/016 |

* cited by examiner

HANDS FREE BICYCLE

CROSS-REFERENCE TO RELATED APPLICATIONS

The present application claims the benefit of U.S. Provisional Patent Application No. 63/159,509, filed Mar. 11, 2021, the contents of which are incorporated by reference herein.

FIELD OF THE INVENTION

The subject matter disclosed herein relates in general to an electric bicycle, and more particularly to an electric bicycle that has "hands free" steering in which the bicycle is steered using the operator's feet.

BACKGROUND OF THE INVENTION

It is well known that two wheeled bicycles typically employ a handlebar steering system, which requires the operator to use their hands and arms to steer the bicycle and to also maintain their balance on the bicycle. It would be beneficial to provide an electric bicycle that allows the operator to steer the bicycle instead using the operator's feet via foot pegs attached to or connected with the front wheel. The design of the electric bicycle of embodiments of the present invention allows for hands free operation of a bicycle that does not currently exist.

BRIEF SUMMARY OF THE INVENTION

An electric bicycle includes a frame that has a concave or arc shape. The bicycle also includes two wheels—a front wheel and a rear wheel, with each wheel being connected with an end portion of the frame. A battery-powered electric motor may be connected with the rear wheel to drive the rear wheel and propel the bicycle forward. The battery may be rechargeable. The speed of the bicycle may be controlled by the operator moving a lever with one of their feet. A rotatable knob located on the frame may be used as a cruise control speed setting device. The electric bicycle may be steered by the operator using their feet resting on a pair of foot pegs that are attached to or connected with the front wheel. The electric bicycle may include a regenerative braking system or a friction braking system.

BRIEF DESCRIPTION OF THE DRAWINGS

The subject matter, which is regarded as the disclosure herein of exemplary embodiments of the present invention, is particularly pointed out and distinctly claimed in the claims at the conclusion of this specification. The forgoing and other features and advantages of the present invention will become more apparent from the following detailed description taken in conjunction with the accompanying drawings in which:

DETAILED DESCRIPTION OF THE INVENTION

Figure 1:
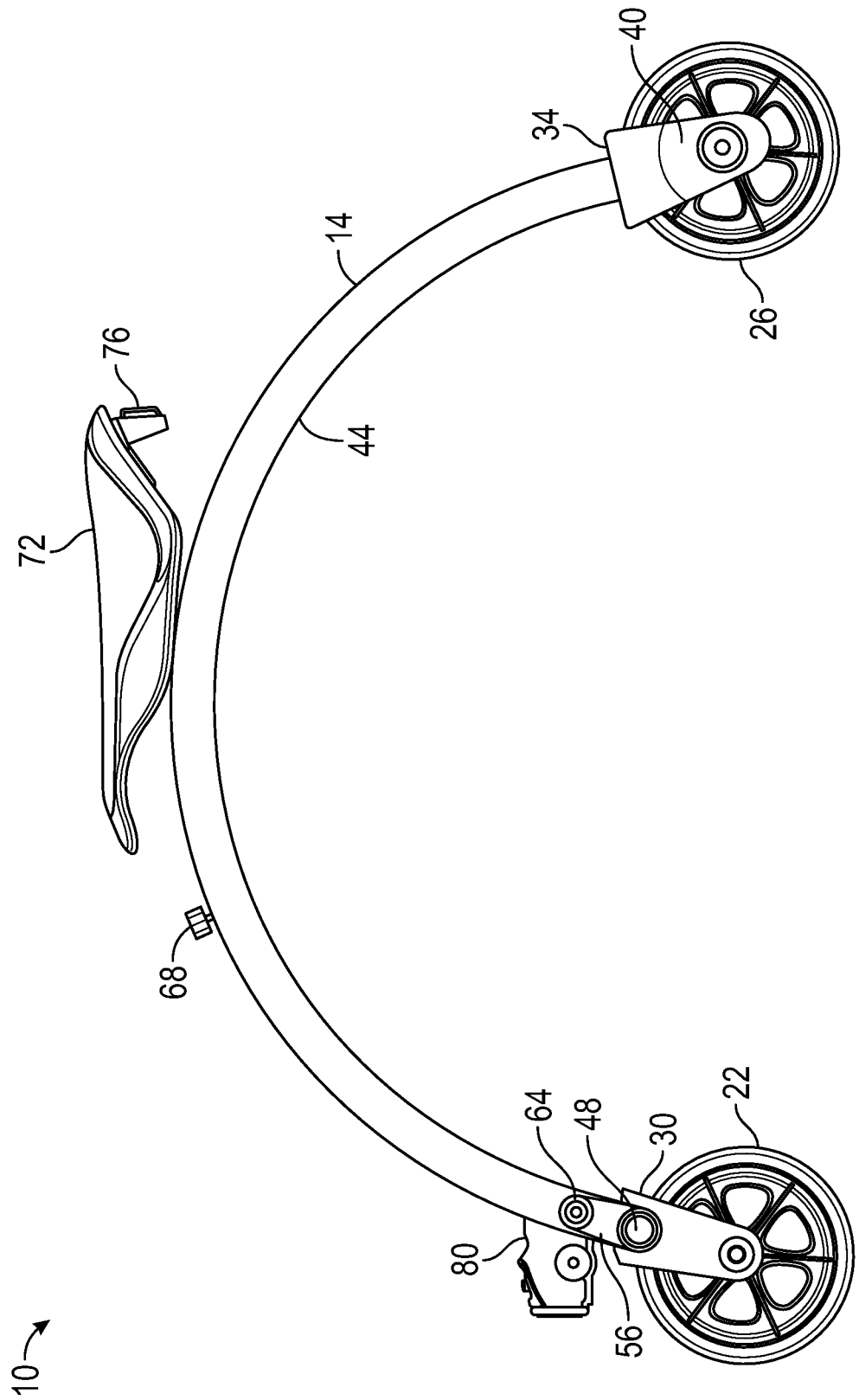
FIG. 1 is a side view of an electric bicycle having hands free steering according to a first embodiment of the present invention.

It should be understood that, throughout this patent application and specifically in the written description that follows and in the accompanying drawing figures, various directional terms such as horizontal, vertical, up, down, upwardly, downwardly, front, back, top, bottom, upper, lower, left, right, and other similar terms as they are used herein refer to the hands free electric bicycle of the various exemplary embodiments of the present invention as that bicycle is typically oriented when used. All of these terms are used in this written description and in the drawings for convenience only and as an aid to better understanding the exemplary embodiments of the present invention. These terms are not intended to be limiting in the claims or to imply that the hands free electric bicycle must be used or positioned in any particular orientation.

Figure 2:
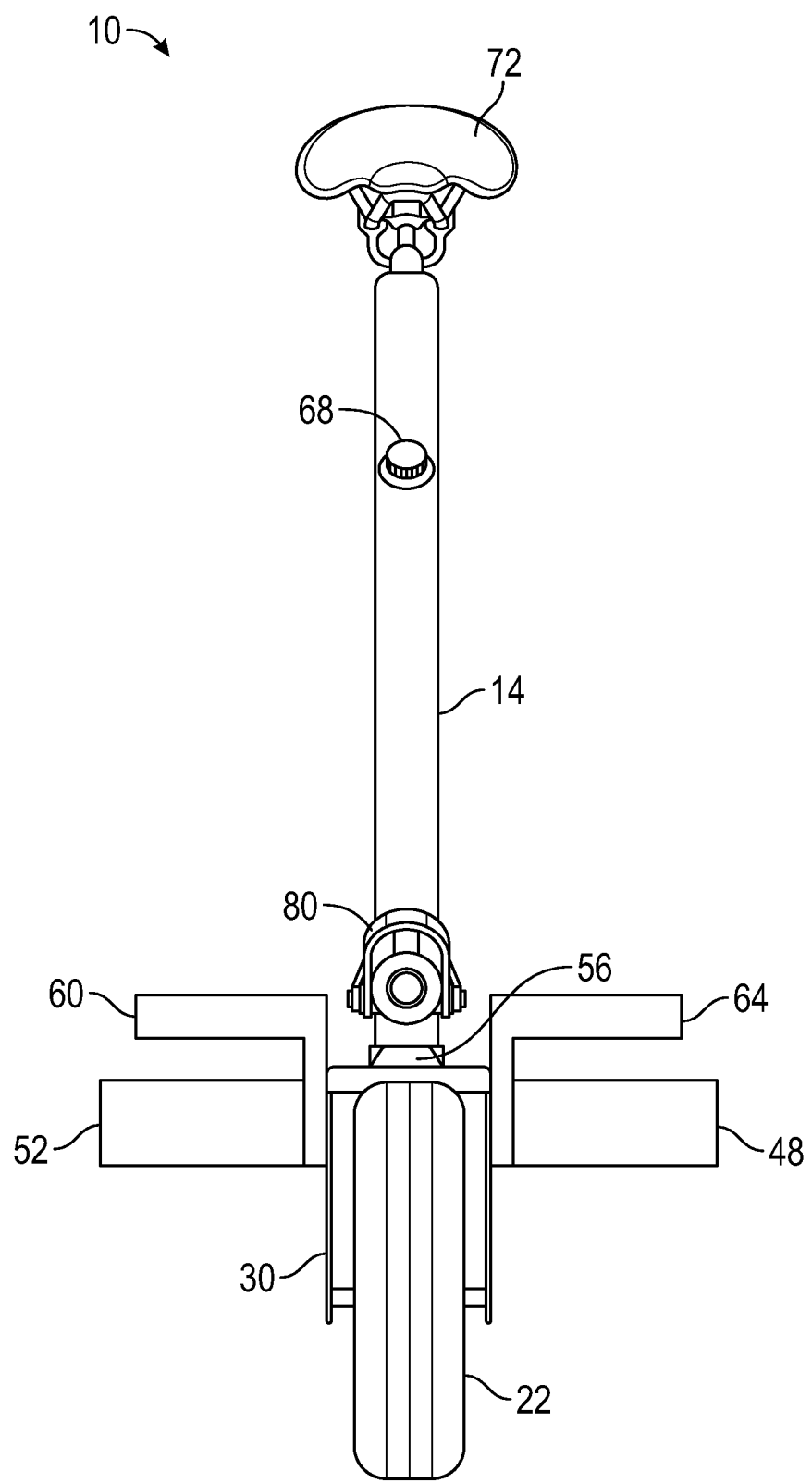
FIG. 2 is a front view of the electric bicycle of FIG. 1.
Figure 3:
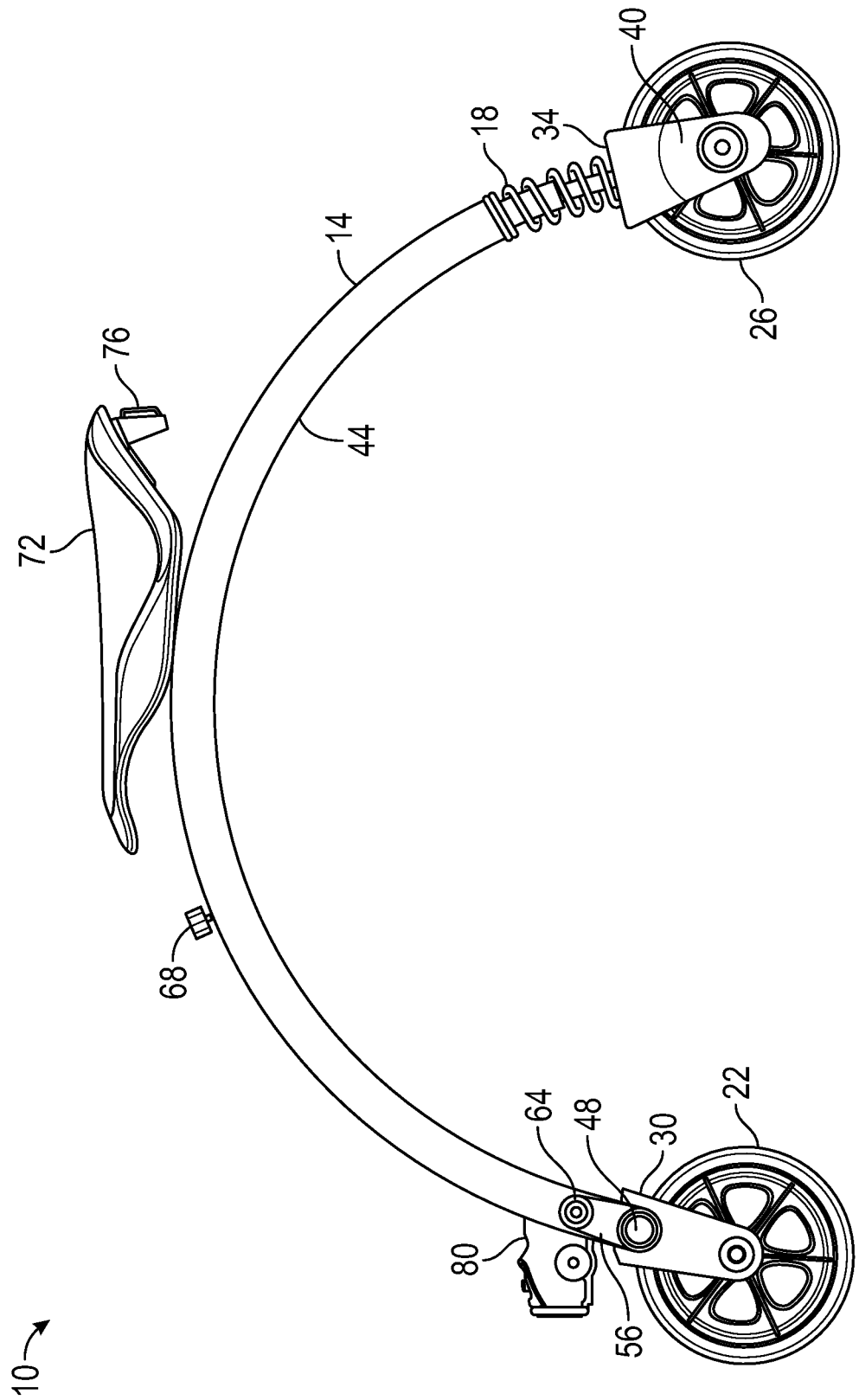
FIG. 3 is a side view of an electric bicycle having hands free steering according to a second embodiment of the present invention.

Referring to FIGS. 1 and 2, there illustrated is a side view and a front view, respectively, of an electric bicycle 10 having a frame 14 according to a first embodiment of the present invention. This embodiment of the electric bicycle 10 is intended primarily for use by an operator on a paved surface (e.g., a road or street) or other relatively smooth or hard surface. In contrast, a second embodiment of an electric bicycle 10 of the present invention is illustrated in the side view of FIG. 3 and is intended for use on more rugged terrain. This second alternative embodiment differs from the first embodiment primarily by the addition of a "coil over shock" suspension 18 to the rear portion of the frame 14. Otherwise, the two embodiments of the electric bicycle 10 are similar such that like reference numerals are used herein to describe similar features.

In these two embodiments, the electric bicycle 10 comprises two wheels 22, 26—a front wheel 22 and a rear wheel 26. Each wheel 22, 26 is connected to a corresponding end portion of the frame 14 that is of a concave shape or an arc shape. The wheels 22, 26 may each be connected to the frame 14 using corresponding brackets 30, 34. The frame 14 may be round or other shape in cross section and may comprise a hollow steel or aluminum tubing, or other rigid material such as hard plastic, titanium, or composite material. It suffices that the material comprising the tubing of the frame 14 be able to support the weight of an operator while the electric bicycle 10 is in normal operation. Also, the tubing of the frame 14 may enclose various components of the electric bicycle 10, for example, electrical wiring or braking components.

The rear wheel 26 may be driven by a battery powered electric motor 40, such as a hub motor located proximate or internal to the rear wheel 26. One or more rechargeable batteries 44 may be provided inside the hollow tubing of the frame 14 and connected with the motor 40. Recharging of the batteries 44 may be carried out by the owner/operator at a location or a charging station (e.g., the operator's home) that has a battery recharging power source, which would connect with the batteries 44 inside the frame 14 using a suitable connector.

Also, embodiments of the electric bicycle 10 of the present invention may include a regenerative braking system, which may be used to provide braking for the electric bicycle 10. As such, the regenerative braking system can provide recharging electric power to the batteries 44 of the electric bicycle 10. This is typically accomplished in a known manner by having the motor 40 also function as an electric generator during the regenerative braking period, with the generator providing recharging electrical current to the batteries 44 in this mode of operation. To implement such a regenerative braking system, the appropriate electrical and mechanical components may be located inside or outside of the tubing of the frame 14.

In the alternative, braking of the electric bicycle 10 may be accomplished using a friction type braking system associated with the front wheel 22 and/or the rear wheel 26. Such a traditional bicycle wheel braking system may be carried out and operated in a well-known manner.

The electric bicycle 10 of embodiments of the present invention is intended to be steered with the operator's feet resting on a pair of front foot pegs 48, 52 (i.e., a left leg foot peg 48 and a right leg foot peg 52). The foot pegs 48, 52 may be attached to or connected with the front wheel 22 using, e.g., the bracket 30. As such, the front wheel 22 may pivot on a bearing 56 that may be similar to that utilized in a typical bicycle front fork assembly.

The speed of the motor and thus of the electric bicycle 10 may be controlled by the operator using their right leg and foot to operate a throttle pedal or lever 60. The throttle lever 60 may be pushed forward by the operator to increase the speed of the electric bicycle 10. As such, the throttle lever 60 pivots and rotates around the right leg foot peg 52. When the operator releases the applied force on the throttle lever 60, the throttle lever 60 moves backward via, e.g., a spring force, and a regenerative braking system may then by activated. In addition, a brake pedal or lever 64 may be provided that pivots and rotates around the left leg foot peg 48. When activated by applied force from the operator's left leg and foot, the brake lever 64 may activate a friction braking system on the front wheel 22.

A rotatable knob 68 is positioned on a top surface of the frame 14 and at a location on the frame 14 in front of a seat 72. The knob 68 may be hard wired to the motor 40 and batteries 44 by wires running inside or outside of the tubing of the frame 14. The knob 68 may function together with the throttle lever 60 as a cruise control speed setting device.

The seat 72 for the operator of the electric bicycle 10 may be affixed to a top portion of the frame 14. The seat 72 may have a rearward-facing light (i.e., a taillight) 76 affixed to the back portion of the seat 72 or the frame 14. The taillight 76 may also indicate a braking condition of the electric bicycle 10. A forward-facing head lamp or light 80 may be affixed to a front portion of the frame 14 to illuminate an area in front of the electric bicycle 10 e.g., during operation thereof.

The expected top speed of the electric bicycle 10 of embodiments of the present invention may be approximately 30 mph. Other possible options include the electric bicycle 10 being foldable, with the folding being facilitated by, for example, by a hinge located in the approximate center of the arc of the frame 14.

Although not shown in the figures, a three-wheel embodiment of the electric bicycle 10 may be provided for the elderly or those balance challenged. This embodiment of the electric bicycle 10 may include one wheel 22 in the front and two wheels 26 in the rear, or vice versa.

The terminology used herein is for the purpose of describing particular embodiments of the invention only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention is provided in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that the exemplary embodiments may include only some of the described exemplary aspects. Accordingly, the invention it not to be seen as limited by the foregoing description but is only limited by the scope of the appended claims.

The invention claimed is:

1. A hands free electric bicycle, comprising:
   a frame having a first end and a second end;
   a front wheel connected with the first end of the frame;
   a rear wheel connected with the second end of the frame;
   an electric motor engaged with the rear wheel for driving the rear wheel to thereby cause movement of the electric bicycle;
   at least one foot peg connected with the front wheel and configured and operable to allow an operator of the electric bicycle to steer the electric bicycle using the feet of the operator, and
   a speed control for controlling the electric motor to thereby control the speed of the electric bicycle, which is operable through use of a throttle lever that pivots and rotates around one foot peg,
   wherein, the electric bicycle does not employ a handlebar steering system, but instead has hands free steering in which the bicycle is steered using the feet of the operator.

2. The electric bicycle of claim 1, wherein the frame has a concave shape or an arc shape.

3. The electric bicycle of claim 1, wherein the frame comprises a hollow tube of a metal, composite, or plastic material.

4. The electric bicycle of claim 1, further comprising a coil over shock suspension connected with the rear wheel and configured and operable to provide a shock absorbing function for the electric bicycle.

5. The electric bicycle of claim 1, further comprising at least one battery connected with the electric motor, wherein the at least one battery is configured and operable to provide electric power to the electric motor.

6. The electric bicycle of claim 5, wherein the at least one battery comprises a rechargeable battery.

7. The electric bicycle of claim 1, further comprising a braking system configured and operable to slow or stop the motion of the electric bicycle by slowing or stopping the motion of at least one of the front wheel or the rear wheel.

8. The electric bicycle of claim 7, wherein the braking system comprises a regenerative braking system.

9. The electric bicycle of claim 8, wherein the regenerative braking system comprises the electric motor operable as a brake for the electric bicycle, and the electric motor operable as an electric generator to provide electrical energy to recharge at least one battery connected with the electric motor, wherein the at least one battery is configured and operable to provide electric power to the electric motor.

10. The electric bicycle of claim 7, wherein the braking system comprises a friction braking system connected with at least one of the front wheel or the rear wheel and is operable through use of a foot pedal.

11. The electric bicycle of claim 1, further comprising at least one footrest connected with the front wheel and configured and operable to allow an operator of the electric bicycle to perform one of resting the feet of the operator on the at least one footrest or of steering the electric bicycle using the feet of the operator.

12. The electric bicycle of claim 1, wherein the electric bicycle is configured and operable to be foldable.

13. The electric bicycle of claim 12, wherein the electric bicycle further comprises at least one hinge connected with the frame, wherein the at least one hinge is configured and operable to facilitate the folding of the frame of the electric bicycle.

14. The electric bicycle of claim 1, further comprising a seat connected with the frame, the seat being configured and operable to allow an operator to sit on the seat during operation of the electric bicycle.

15. The electric bicycle of claim 14, further comprising a taillight connected with one of the seat or the frame, wherein the light is configured and operable to visually indicate a braking condition of the electric bicycle.

16. The electric bicycle of claim 1, further comprising a headlight connected with a front portion of the frame, wherein the headlight is configured and operable to visually illuminate a spatial area in front of the electric bicycle.

17. The electric bicycle of claim 1, further comprising at least two rear wheels or at least two front wheels.

18. The electric bicycle of claim 1, wherein the throttle lever is the only lever that pivots and rotates around the one foot peg.

19. An electric bicycle, comprising:
a frame having a first end and a second end;
a front wheel connected with the first end of the frame;
a rear wheel connected with the second end of the frame;
an electric motor engaged with the rear wheel for driving the rear wheel to thereby cause movement of the electric bicycle;
two foot pegs positioned on opposing sides of, and connected with the front wheel and configured and operable to allow an operator of the electric bicycle to steer the electric bicycle using the feet of the operator;
a speed control for controlling the electric motor to thereby control the speed of the electric bicycle, which is operable through use of a throttle lever that pivots and rotates around one foot peg; and
a brake pedal or lever that pivots and rotates around the other foot peg.

* * * * *